March 22, 1932. O. C. GALL 1,850,100
DEVICE FOR STERILIZING AND RENOVATING BEEHIVES, ETC
Filed Dec. 10, 1928
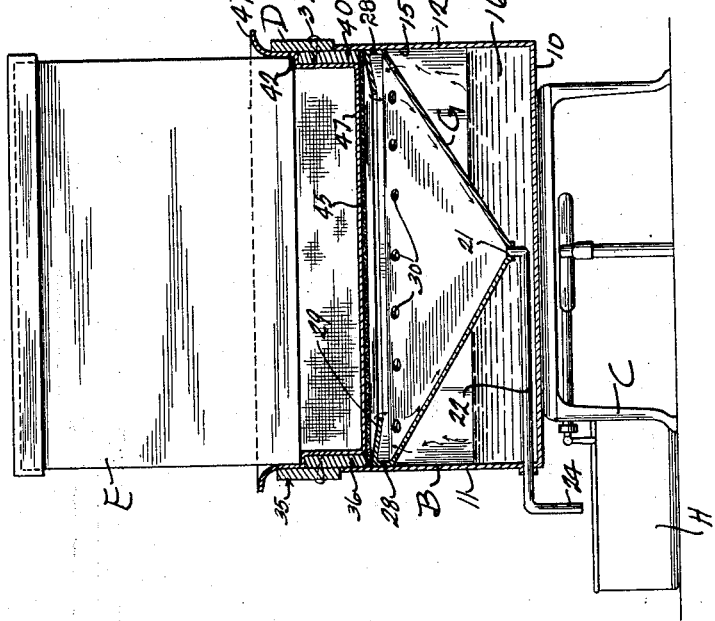
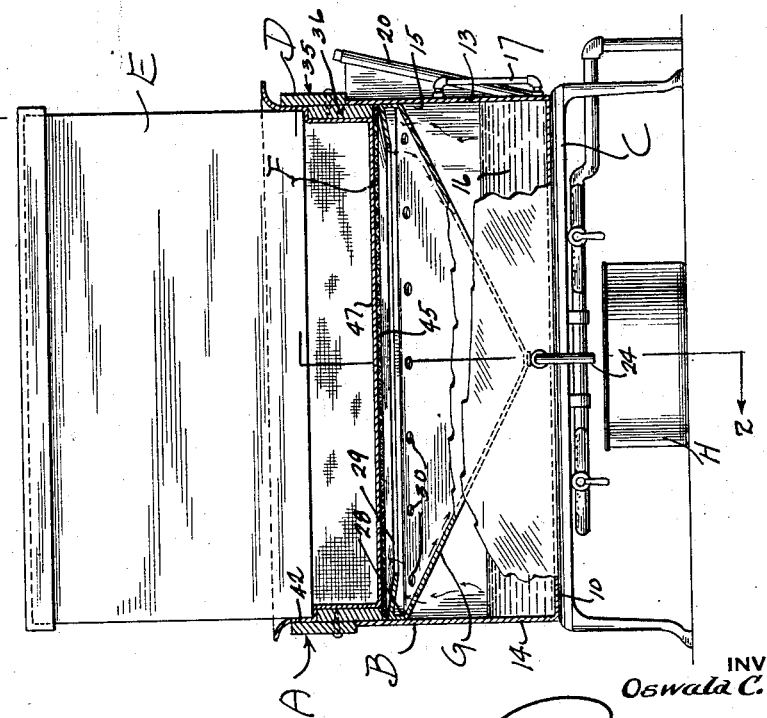
INVENTOR.
Oswald C. Gall
ATTORNEYS.

Patented Mar. 22, 1932

1,850,100

UNITED STATES PATENT OFFICE

OSWALD C. GALL, OF HURON, OHIO

DEVICE FOR STERILIZING AND RENOVATING BEEHIVES, ETC.

Application filed December 10, 1928. Serial No. 325,009.

This invention relates to improvements in devices for sterilizing and renovating bee hives and the like.

The primary object of this invention is the provision of improved apparatus by means of which a bee hive may be thoroughly sterilized by the removal of the honey and wax therefrom, without the loss of either the honey or the wax; and which will be especially useful in connection with the sterilizing of hives in which "foul brood" is present.

A further object of this invention is the provision of an appliance for use by those engaged in bee culture, which may be efficiently and expeditiously used for sterilizing hives, containers and like apparatus pertaining to bee culture; as well as the filtering and reclamation of cappings or any other wax or honey, without waste and loss.

Other objects and advantages of this invention will be apparent during the course of the following detailed description.

In the accompanying drawings forming a part of this specification, and wherein similar reference characters designate corresponding parts throughout the several views, Figure 1 is a front elevation, partly in section, showing the improved sterilizing apparatus in position for sterilizing a bee hive.

Figure 2 is a cross sectional view taken through the details of the apparatus, substantially on the line 2—2 of Figure 1.

In the drawings, wherein for the purpose of illustration is shown only a preferred embodiment of the invention, the letter A may generally designate the improved apparatus, which preferably consists of a tank or container B adapted to contain water and be supported upon some heating element C, such as a stove, for the purpose of generating steam. A preferably detachable top frame or section D is provided, adapted to support a bee hive E, or other apparatus to be sterilized; and also to support filtering and straining means F from which impurities are strained in order that honey, wax and the like to be reclaimed may fall upon a guide G, in the nature of a funnel, from whence the honey or wax is guided into a suitable receptacle H.

The tank or container B is preferably of sheet metal, either galvanized iron, tin, copper, or the like. It preferably includes a bottom 10, side walls 11 and 12, and end walls 13 and 14, which define a compartment 15 adapted to receive a body of water 16 to be heated. At one end the tank B, preferably on the wall 13, may be provided a water gauge glass 17 of any approved construction, and on said wall may also be provided a filler spout 20 of any approved construction.

The means G for receiving and guiding the honey and wax as it is filtered or strained through the means E, preferably comprises a sheet of metal, in the form of a funnel, converging downwardly from the side and end walls of the tank B, at a location above the normal liquid level, towards the center of the tank or receptacle B, where the said funnel or means G is provided with a conduit connection or opening 21, to which a horizontal conduit has connection; the conduit 22 extending horizontally through the tank and exteriorly thru a side wall 11 of the tank, and having a downturned spout 24 adapted to convey the contents received in the funnel G into the exterior receptacle H.

The funnel G at its upper peripheral margins abuts against the inner surfaces of the sides and end walls; being provided with upturned flanges 28, for such purpose, shown in the drawings. A sloping deflector flange 29 is provided peripherally about the upper margin of the funnel G, overhanging the marginal portions of the funnel G, in spaced relation, entirely about the container B; the deflector flange 29 being sloped inwardly in a downwardly convergent relation. The margins of the funnel G about the walls of the tank, below the deflector flange 29, are provided with openings 30 through which live steam passes from the tank B below the funnel upwardly beneath the deflector 29 and thence centrally towards the tank and upwardly through the filter means F, for melting and dislodging honey, wax, and impurities, from the hive container.

With respect to the frame D, the same comprises a pair of preferably square or rectangular box frames 35 and 36, which are secured as by riveting or nailing at 37. They are secured in axial offset relation, with the inner frame 36 abutting internally with the walls of the frame 35, so as to provide a reduced extension 40 on the lower marginal portion of the frame 36, which is adapted to snugly fit into the upper part of the tank B above the deflector flange 29 of the funnel device G. By offsetting the frames 35 and 36, a socket 42 is provided in the upper frame 35 above the top margin of the inner frame 36, in order to receive the lower part of a hive E in a resting relation upon the upper edges of the frame 36.

A screen 45 is attached to the lower edges or margin of the frame section D, which may be of any approved mesh, and a preferably fabric filter 47 is adapted to be disposed in a bag-like relation over the screen 45 and along the inside walls of the frames 35 and 36, with the marginal edges thereof extending out of the frame section D, so that the hive E may rest in the frame section D, and hold the fabric filter 47 in a bag-like position for straining and filtering the contents of the hive as they are melted or rendered less viscid.

The operation of the invention will be apparent from the foregoing. In diseased hives, which it is desired to sterilize, the entire hive with open bottom, is placed in the upper socket end 42 of the detachable filter section D, and the steam from the tank will pass upwardly thru the openings 30 and into the hive, sterilizing the same; melting the wax and honey, and permitting the same to flow into the filter compartment from whence it flows downwardly into the funnel G; being prevented from entering the steam inlet openings 30, because of the baffle flanges 29; the honey and wax passing thru the conduit 22. Of course, the top or upper section D is made to fit a standard hive. The cover is preferably on the hive, and the honey commences to flow first from the hive, and is caught in the receptacle H. After a proper length of time, the steam will melt the wax, but by this time the honey has entirely drained into the receptacle H, and the wax is then run into a large receptacle about half full of cold water. The live steam is permitted to circulate in the hive from one to two hours, and the hive container is then permitted to dry in the sun or open air, to eliminate any danger of "foul brood" remaining. The improved device may be used to clean any hive in which the comb is old, sagged, or where the cells are too small. The saving in cost of new frames and wiring is considerable, since heretofore diseased hives were destroyed, and in addition the honey is thoroughly sterilized and can be fed back to the bees without danger of "foul brood". For this reason the swarm, which has been admitted to a new hive, will be as far ahead as before the sterilization.

Various changes in the shape, size, and arrangement of parts may be made to the form of invention herein shown and described, without departing from the spirit of the invention or the scope of the claims.

I claim:

1. In apparatus for sterilizing bee hives and the like the combination of a tank adapted to receive a liquid, means at the upper portion of the tank for supporting an opened bottom bee hive with the open bottom spaced from the facing bottom of the tank, means below the first mentioned means for directing steam into the hive, and means in the tank above the normal level of liquid therein and below the open bottom of the hive for receiving and guiding melted honey and wax direct from the hive as the steam plays into the latter.

2. In apparatus of the class described the combination of a tank adapted to receive a body of water for generating steam, means on the top of the tank for supporting a bee hive with an open bottom facing the tank, means between the bee hive and above the normal level of liquid in the tank for deflecting and guiding materials falling from the hive to a location remote from the water in the tank, means between the last mentioned means and the hive for filtering and straining melted and other materials falling from the hive.

3. In apparatus of the class described the combination of a tank, a funnel shaped receiver in the tank having a conduit connection extending from the lower end of the funnel shaped receiver to a location exteriorly of the tank, the funnel shaped receiver being supported in the tank to provide a compartment in the tank therebelow for receiving water to be heated, means on the tank above the funnel shaped receiver for supporting objects to be sterilized, the funnel shaped receiver having perforations therein about the upper margins thereof to permit steam to pass from the compartment in the tank from below the receiver to above the receiver.

4. In apparatus of the class described the combination of a tank, a funnel shaped receiver in the tank having a conduit connection extending from the lower end of the funnel shaped receiver to a location exteriorly of the tank, the funnel shaped receiver being supported in the tank to provide a compartment in the tank therebelow for receiving water to be heated, means on the tank above the funnel shaped receiver for supporting objects to be sterilized, the funnel shaped receiver having perforations therein about the upper margins thereof to permit steam to pass from the compartment in the tank below the receiver to above the receiver, and means above the perforation for deflecting materials to the receiver laterally of and below said perforations.

5. In apparatus of the class described a tank adapted to receive a body of water to be heated for generating steam, a detachable frame support on the top of the tank having means to support a hive thereon with its open bottom facing the tank, and means below the hive and above the normal level of water therein for receiving materials dropping from the hive incident to the admission of steam therein from the tank, said means being formed to permit steam to pass thereby into the hive.

6. In apparatus of the class described a tank adapted to receive a body of water to be heated for generating steam, a detachable frame support on the top of the tank having means to support a hive thereon with its open bottom facing the tank, means below the hive and above the normal level of water therein for receiving materials dropping from the hive incident to the admission of steam therein from the tank, said means consisting of a filtering strainer, and a funnel shaped conveyor below the filtering strainer placed and formed to permit steam to pass upwardly thereby into the hive.

OSWALD C. GALL.